United States Patent Office 3,019,264
Patented Jan. 30, 1962

---

3,019,264
2-(2,2,3-TRIMETHYLCYCLOBUTYL)-HEPTA-2,4-DIEN-6-ONE
Habib Emile Eschinazi, now, by judicial change of name, Emile Haviv Eschinasi, Montclair, N.J., assignor to The Givaudan Corporation, New York, N.Y., a corporation of New Jersey
No Drawing. Filed Apr. 2, 1959, Ser. No. 803,595
1 Claim. (Cl. 260—586)

This invention relates to the novel chemical, 2-(2,2,3-trimethylcyclobutyl)-hepta-2,4-dien-6-one, and to a process for preparing it.

The novel material of this invention is useful as a perfume material and as an intermediate in the preparation of chemicals of the orris-root type such as irones, which are used in the perfume and pharmaceutical industries. An example of a synthesis in which the novel material of this invention may be used is set forth in accepted abbreviated form, as follows:

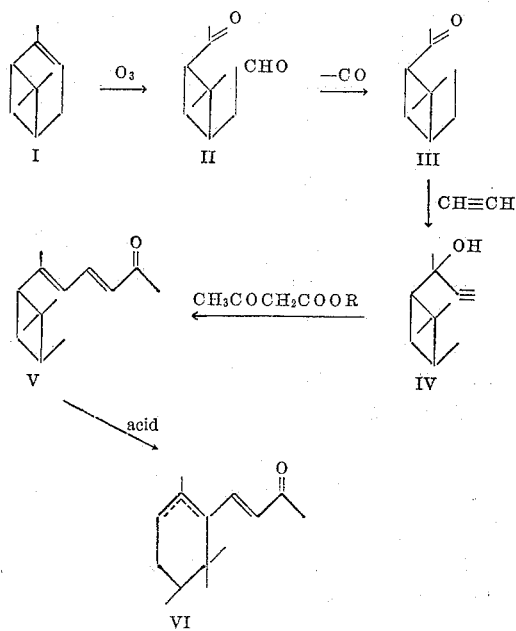

The names of the compounds represented by the Roman numerals in the foregoing sequence are as follows:

I α-pinene
II pinonic aldehyde
III 1-acetyl-2,2,3-trimethylcyclobutane
IV 3-(2,2,3-trimethylcyclobutyl)-but-1-yn-3-ol
V 2-(2,2,3-trimethylcyclobutyl)-hepta-2,4-dien-6-one
VI irone Novel processes and/or novel products involved in the preparation of II, III, IV and VI are disclosed and claimed in the following applications filed of even date herewith by the present applicant: Ser. No. 803,593; Ser. No. 803,594; Ser. No. 803,565; Ser. No. 803,596; respectively.

The novel material of this invention is prepared by reacting 3-(2,2,3-trimethylcyclobutyl)-but-1-yn-3-ol with a lower alkyl ester or acetoacetic acid or diketene, with or without catayslts or solvents, at an elevated temperature.

As esters of acetoacetic acid any ester boiling below about 170–190° C. may be used. Methylacetoacetate and ethyl acetoacetate are preferred, for practical reasons.

When catalysts are used, basic catalysts such as aluminum isopropylate or sodium ethoxide are satisfactory, as well as acid catalysts, such as nicotinic acid and p-toluenesulfonic acid. For economic reasons it is preferred to dispense with the use of any catalysts, as no great difference or beneficial effect accompanies their use.

Solvents may be used, if desired, to supply an inert medium for the decarboxylation and the rearrangement which result in the desired product. High boiling mineral oils, such as decaline or hydrocarbons boiling about 200° C., are recommended for this purpose.

The proportions of the reactants may be varied, within limits. The acetoacetic ester or diketene may be used within the range from about 1 to about 5 mols of the ethynol employed; however, it is preferred to employ about 1 to 2 mols of the ester or diketene per mole of ethynol.

Amounts of solvent which may be used may vary between 0 to 10 volumes of the reaction mixture; amounts from about 0–2 volumes, being especially satisfactory.

Amounts of catalysts which may be used may vary between 0–5% of the weight of the reaction mixture; amounts from about 0–2% being advantageous.

The temperature at which the process of this invention is conducted may also vary, within limits. Temperatures within the range from about 150° C. to about 200° C. have been found satisfactory, temperatures between about 175° to about 185° C. being preferred.

In order to illustrate this invention the following example is given, but not by way of limitation.

EXAMPLE (a) *Preparation of 2,2-dimethyl-3-acetylcyclobutylacetaldehyde*

136 g. of α-pinene, 120 ml. methanol and 60 ml. of water were placed in a 500 ml. reaction vessel cooled from the outside with an ice-water bath, while a stream of ozonized oxygen, from a commercial "Welsbach" T23 ozonator and containing approximately 70–75 mg. ozone per liter, was fed at the rate of 100 liters/hour through a glass, porous pipe dipped into the mixture. After about 7 hrs., the ozone started bleeding out with the outgoing gases and the ozonization was stopped. The reaction mixture was then transferred into a 2-liter flask equipped with a stirrer, a reflux condenser and a dropping funnel and containing 500 ml. water, 50 ml. benzene and 65 g. zinc dust. Then 160 g. 62% sulfuric acid was added under agitation within 5–10 minutes. The reaction mixture started to boil vigorously and was kept under agitation for 10 more minutes. After cooling, the layers are separated and the bottom layer extracted twice with 100 ml. benzene. The combined organic layers are now neutralized with soda ash and the solvent evaporated, leaving behind 140 g. of crude pinonic aldehyde showing a purity of approximately 90% by oximation.

Upon distillation in a 1½-ft. column, approximately 10% of a light cut is obtained followed by about 113 g. of pure pinonic aldehyde boiling at 93° at 3 mm., $n_D^{20}$ 1.4610, $\alpha_D$ 40° showing 98.5% purity by oximation.

(b) *Preparation of 1-acetyl-2,2,3-trimethylcyclobutane*

Into a 3-necked flask provided with a stirrer, a thermometer, a dropping funnel and a short column with a reflux condenser, 35–40 ml. of pinonic aldehyde is introduced; then 0.5 g. of a 5% palladium on charcoal catalyst is added and the mixture heated under stirring to 200–230°. Carbon monoxide starts to be evolved and is measured by passing the liberated gases through a wet-test meter and then discharged into a very efficient hood (toxic CO). As soon as the gas evolution reaches about 2 liters, additional pinonic aldehyde is slowly introduced through the dropping funnel, while the light distillate of pinonone (below 150°) is collected.

The rate of addition of pinonic aldehyde is so adjusted, that it is approximately equal to the amount of distilled pinonone. The reaction temperature is maintained around 210–220°. 400 g. of pinonic aldehyde is thus introduced within 6–7 hrs., while 55 liters of CO are measured. The total amount of distillate reaches 305 g. and a slight vacuum applied towards the end results in an additional 5–10 g. distillate. The residue consists of about 30 g. of dark, heavy liquid from which the catalyst may be recovered.

The pure pinonone boils at 55–57° at 10 mm. pressure, $n_D^{20}$ 1.4400–1.4410. It consists of a mixture of cis and trans isomers. A semicarbazone M.P. 197–8 and a 2.4 dinitrophenyl hydrazone M.P. 201–202° were obtained from the distilled pinonone.

(c) Preparation of 3-(2,2,3-trimethylcyclobutyl)-but-1-yn-3-oil

In a dry one-liter 3-necked flask are added 280 g. methylal and 224 g. powdered KOH. The flask is provided with a gas inlet tube, an efficient stirrer, a dropping funnel and a gas outlet. The mixture is agitated and cooled to −10° while a dry stream of acetylene is bubbled through. For the first 20–30 minutes, the acetylene is practically all absorbed in the reaction mixture as evidenced by the very small amount of gas bleeding from the gas outlet. As soon as the gas discharge increases, 140 g. of pinonone is slowly introduced around −10 to −5° while the acetylene is being continuously fed. The addition of the ketone is made within about 4 hrs. The mixture is agitated for an additional 2 hrs. and the bubbling of acetylene is continued at such a rate that a small bleeding of the gas takes place continuously, while the temperature is maintained at −5° or slightly below. 500 ml. of ice water are now introduced very slowly under cooling and strong agitation, so that the temperature does not rise above +30°. The top layer is separated and the aqueous layer extracted with benzene. The combined organic layers are freed from the solvents and the 3-(2,2,3-trimethylcyclobutyl)-but-1-yn-3-ol is obtained as a mixture of cis-trans isomers boiling at 70–74° at 8 mm., $n_D^{20}$ 1.4622–1.4670, $\alpha_D$ −3 in a yield of approximately 90% based on the reacted pinonone.

*Analysis.*—Calc'd. for $C_{11}H_{18}O$: C, 79.46; H, 10.91. Found: C, 79.76; H, 11.02.

(d) Preparation of 2-(2,2,3-trimethylcyclobutyl)-hepta-2,4-dien-6-one 332 g. 3-(2,2,3-trimethylcyclobutyl)-but-1-yn-3-ol, 520 g. ethylacetoacetate are heated in a 2-liter flask provided with a stirrer, a short insulated column (1½ ft.) and a distilling head with a reflux condenser connected to a gas wet-test meter.

The reaction mixture is agitated while heat is being applied. When the reaction temperature reaches 160°, carbon dioxide is evolved and alcohol is distilled at the top of the column between 66–72°. After about 5 hrs., the reaction temperature reaches 178–180° and the amount of gas liberated reaches ca. 45 liters and about 80–85 g. ethanol are collected as the distillate, the decarboxylation is practically finished. Vacuum is then applied and the following cuts distilled:

| | B. P.: | | |
|---|---|---|---|
| 1 | 40 mm. up to 104°=320 g | | 1.4282 (average) |
| 2 | 3 mm. up to 90°= 12 g | $n_D^{20}$ | 1.4750 |
| 3 | 1.5 mm. up to 114°=15 g | | 1.4950 |
| 4 | 1 mm. up to 110–130°=270 g | | 1.5210 |
| Res | =40–50 g | | |

Cut #4 is the main cut and consists of an isomeric mixture of 2-(2,2,3-trimethylcyclobutyl)-hepta-2,4-dien-6-one, from which a semicarbazone, M.P. 204–205°, and a 2,4-dinitrophenyl hydrazone, M.P. 198–199°, was isolated. Cut #1 consists almost entirely of ethylacetoacetate, cuts 2 and 3 contain some unreacted ethynol and some of the desired ketone mixed with dehydroacetic acid. They may be reworked for the recovery of an additional 50–55 g. of the main cut.

The foregoing illustrates the practice of this invention, which, however, is not to be limited thereby, but is to be construed and limited solely by the appended claim.

I claim:
The chemical product having the formula, 2-(2,2,3-trimethylcyclobutyl)-hepta-2,4-dien-6-one.

References Cited in the file of this patent
UNITED STATES PATENTS 2,661,368     Kimel et al.     Dec. 1, 1953

OTHER REFERENCES

Chelintsev et al.: Chem. Abstracts, vol. 34, page 4387 (1940).